United States Patent [19]

Underwood

[11] 4,364,895
[45] Dec. 21, 1982

[54] FLUID-ASSISTED CORE-RELEASE METHOD AND APPARATUS

[76] Inventor: J. Larry Underwood, c/o Underwood Mold Company, Inc. 104 Dixie Dr., Woodstock, Ga. 30188

[21] Appl. No.: 288,168

[22] Filed: Jul. 29, 1981

[51] Int. Cl.³ .................. B29C 7/00; B29F 1/14
[52] U.S. Cl. .................. 264/335; 249/66 A; 425/437; 425/438; 425/556
[58] Field of Search .......... 249/66 A, 67, 66 C; 264/335; 425/437, 438, 556

[56] References Cited

U.S. PATENT DOCUMENTS

| | | | |
|---|---|---|---|
| 2,741,797 | 4/1956 | Britton | 264/335 |
| 3,183,292 | 5/1965 | Dvoracek | 264/335 |
| 3,671,159 | 6/1972 | Greenberg et al. | 425/437 X |
| 3,996,329 | 12/1976 | Holland et al. | 264/335 X |
| 4,289,726 | 9/1981 | Potoczky | 264/335 |

*Primary Examiner*—J. Howard Flint, Jr.
*Attorney, Agent, or Firm*—Jenkins, Coffey, Hyland, Badger & Conard

[57] ABSTRACT

An apparatus for assisting in the removal of an ejection-molded article from the core of a mold is disclosed in combination with a molding machine in which the mold core is fixed to a moving platen and an ejector mechanism is supplied which mechanically removes the article from the core. The assisting apparatus includes a conduit leading to a surface of the mold core which defines the bottom of the article formed. A piston and cylinder is connected to the conduit, the interior of the cylinder being dimensioned to be approximately equal to the interior volume of the article formed. The cylinder is fixed with respect to the platen, while the piston is fixed with respect to the ejector apparatus. As the ejector moves with respect to the mold core so as to mechanically strip the molded article from the core, the piston moves within the cylinder which is filled with air at approximately 1 atmosphere, thereby causing the air within the cylinder to be introduced into the conduit and thus into the void developing between the bottom of the formed article and the mold core, thereby preventing deformation of the formed article.

10 Claims, 1 Drawing Figure

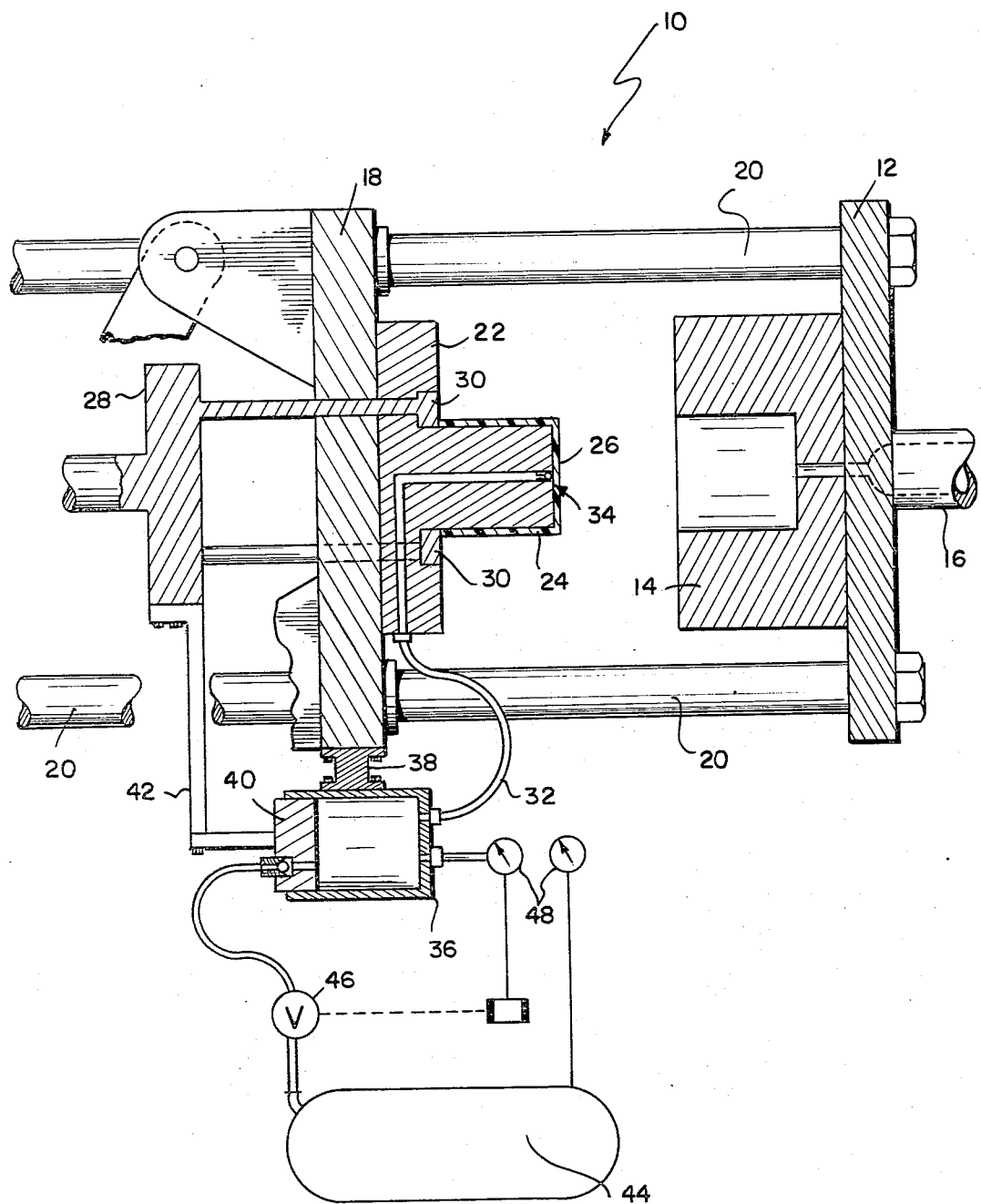

FLUID-ASSISTED CORE-RELEASE METHOD AND APPARATUS

The present invention is directed generally to molding machines and processes of molding thermoplastics. The invention is directed particularly to a method and apparatus for assisting in the process of removing molded articles from a mold so as to retain features created in the molding operation.

The injection molding of thermoplastics is a well-known process by which plastics generally in granular, pellet, or powdered form are first heated to a viscous melted state and then injected under high pressure into a mold where the plastic cools to a solid shape conforming to the contours of the mold walls. The resulting articles are usually finished products requiring no further work prior to assembly into or use as finished products.

In general, a mold comprises a mold cavity and a mold core, the molded article being formed between the opposed core and cavity when the viscous melted thermoplastic is injected into the space between the core and cavity. When the article is sufficiently cool so as to retain its shape, the core and cavity separate one from the other and the article is then removed, usually with the aid of an ejector means, from the space between the core and cavity. The ejector means may take various forms.

An ejector means can comprise an ejector plate which is movable with respect to the moving platen of the molding machine to which is mounted and mold core. A series of ejector pins are positioned on the ejector plate and held in place by an ejector retainer plate. As the ejector system moves forward with respect to the moving platen, the pins contact the previously molded articles to the mold core at designated points, knocking them free to drop down out of the space between the mold core and cavity.

In other situations, the ejector means employed can comprise a core pin which is usually centered on the article formed in the mold and surrounded by an ejector sleeve. When ejecting a narrow rib or part edge, it is also possible to use a thin ejector blade. Another common method of ejection is to have an entire plate move forward over the stationary core to mechanically remove the parts. The plate is usually called a stripper plate, and the molds with which they are used are often referred to as stripper plate molds.

The present invention is intended to be employed with any ejector means of which those previously discussed are merely illustrative.

The cooling of the mold, and hence the article in the mold, so as to retain its shape is easily achieved by having chilled water circulate through interconnecting drilled holes in the individual mold plates, and particularly near the core, the water carrying away the unwanted heat. The cooling portion of the complete injection cycle typically represents the major amount of time employed in the molding sequence. Since a shorter molding cycle will result in the creation of more molded articles per unit time per machine, it is generally desirable to cool no more than is necessary to have the article retain its shape.

With some articles, particularly with straight wall or reverse draft wall containers, the cooling cycle must be particularly long in order to permit the formed article to be removed from the core. The walls of the container surround the core in such a fashion as to make the removal of the article from the core mechanically difficult. In a straight wall container, the stripping of the container from the core tends to create a vacuum inside the container since the core is retreating in piston-like fashion down a cylinder defined by the container whose end wall is closed by the bottom of the container. The vacuum thus created between the core and the bottom of the container causes the bottom of the container to deflect inwardly and, upon occasion, rupture. While a longer cooling cycle tends to strengthen the bottom of the container, the molding cycle is usually so slow as to render the manufacture of such items uneconomical.

It has been suggested and attempted to introduce pressurized air into the space between the core face which defines the bottom of the container and the bottom of the container, but this introduction of pressurized air has caused its own problems. Namely, the pressure has caused the bottom of the container to bow outwardly and, upon occasion, destruct.

It is therefore an object of the present invention to provide a means for assisting in the removal of a molded article from a mold in such a manner as to retain the features of the article created in the molding operation. It is a further object of the present invention to provide an apparatus for assisting in the removal of straight wall containers from the core such that the bottom of the container is unaffected by the removal of the container from the core.

These and other objects of the present invention can be achieved by providing an apparatus for assisting in the removal of an injection-molded article from the core of a mold as provided in the present invention. In accordance with the present invention, a conduit is provided which leads to a surface of the mold core against which the molded article is formed and a means is provided for introducing into the conduits a measured volume of fluid at about atmospheric pressure at a rate controlled by the rate of the rate of relative movement between the platen to which the mold core is mounted and the ejector means. Where the article being molded is a straight wall container, the conduit leads to the surface of the core which defines the bottom of the container.

In a preferred embodiment, the invention takes the form of a piston in a cylinder, the interior of the cylinder being connected to the conduit. The piston is connected to either the core means, with the cylinder being connected to the other of said elements. As the platen to which the mold core is mounted and the ejector means move with respect to each other, the piston is displaced within the cylinder, causing the fluid to be transmitted through the conduit. Where the volume of the cylinder included by the piston is approximately equal to the volume of the container being molded, the amount of fluid introduced between the end of the core and the bottom of the container is such as will maintain that space at a pressure of approximately 1 atmosphere, thereby preventing the bottom of the container from being distorted.

The fluid is preferably air, introduced at a pressure of about 1 atmosphere, although the pressure can exceed that to perhaps as high as 1.4 atmospheres. Where an elevated pressure is employed, a chamber of variable volumes such as the piston and cylinder arrangement previously described is connected to a means for supplying air at an elevated pressure and an additional means for introducing the elevated pressure air to the chamber at one point in the molded cycle.

The invention may be thought of as a method of assisting in the removal of an injection-molded article from the core of a mold by providing a conduit to a surface of the mold core against which the molded article is formed, and introducing into the conduit a measured volume of fluid at about atmospheric pressure at a rate controlled by the rate of relative motion between the mold core platen and the ejector means. The accompanying drawing illustrates the invention, and shows a preferred embodiment examplifying the best mode of carrying out the invention as presently perceived.

The drawing is a schematic diagram, partially in section, of a molding apparatus constructed in accordance with the present invention.

FIG. 1 shows an injection-molding machine 10 comprising a stationary platen 12 to which is fixed the mold cavity 14 and the nozzle 16 of the injection unit which supplies the mold with the viscous melted plastics at the desired time. A moving platen 18 moves with respect to the fixed platen 12 on tie rods 20 by means of a clamp unit (not shown). Any of various designs of clamp units may be employed of mechanical, hydraulic, or hydromechanical design. The core of the mold 22 is fixed to the moving platen 18 and reciprocates with respect to the mold cavity 14. When the mold cavity 14 and core 22 abut, there is defined therebetween a space into which the viscous thermoplastic is injected, forming a molded article shown in FIG. 1 as a straight wall cylindrical container 24 having a container bottom 26. When the article 24 is formed, and sufficiently cooled, the core 22 and cavity 14 separate to the position illustrated and an ejector means 28 moves toward the moving platen 18, thereby mechanically removing the molded article 24 from the core 22 by means of element 30 shown in the drawing as a stripper ring.

In the present invention, there is provided a conduit 32 leading to surface 34 of the mold core 22 against which the molded article 24 is formed. As shown, the surface 34 defines the bottom 26 of the container. The conduit 32 is in turn connected to a cylinder 36 which is fixed to the moving platen 18 by an appropriate mounting means 38. A piston 40 is provided within cylinder 36, the piston being mechanically connected to the ejector means 28 by an appropriate linkage 42. As the ejector means 28 moves toward the movable plate 18, the piston 40 moves within cylinder 36, thereby causing any fluid within the cylinder 36 to be displaced from the cylinder into conduit 32 leading to the interface between the surface 34 of mold core 22 and the bottom 26 of the molded article 24.

In accordance with the present invention, it is intended that the cylinder 36 would contain a fluid such as air at approximately atmospheric pressure. It is further intended that the dimensions of the cylinder 36 would be selected such that the volume swept out by the piston 40 moving through cylinder 36 would approximately equal the volume developing between surface 34 and mold 22 and the bottom of the container 26, in this way maintaining the bottom of container 26 undistorted.

It may be necessary that the air in container 36 be slightly above atmospheric pressure, in which case an appropriate means 44 such as a compressor may be employed to supply air at an elevated pressure to cylinder 36, the air being introduced into the cylinder 36 at a point in the injection cycle other than during the article ejection from the mold core. Appropriate valves 46 and pressure sensors 48 can be employed to carry out the intent of the present invention.

It is important to understand that the fluid being introduced between surface 34 of mold 22 and the bottom 26 of container 24 does not act to hydraulically remove the container 24 from the mold core 22. The article 22 is mechanically ejected from the core by the ejector means 29 and the introduction of fluid is merely to ensure that the bottom 26 remains substantially undistored during the article ejection.

Although the invention has been described in detail with reference to an illustrated schematic embodiment, variations and modifications can exist within the scope and spirit of the invention as described and defined in the following claims.

What is claimed is:

1. An apparatus for assisting in the removal of an injection-molded article from a core of a mold in which th article was formed, the mold core being movable with respect to an ejector means for mechanically removing the molded article from the core, the apparatus comprising
   a conduit leading to a surface of the mold core against which the molded article is formed, and
   means for introducing into the conduit a measured volume of fluid at about atmospheric pressure at a rate controlled by the rate of relative movement between the core and the ejector means.

2. The apparatus of claim 1 wherein the core is a straight walled core for molding a container having a straight wall, and said conduit leads to an end surface of the core defining the bottom of the container.

3. The apparatus of claim 2 wherein the means for introducing comprises a piston in a cylinder, the interior of the cylinder being connected to the conduit.

4. The apparatus of claim 2 wherein the means for introducing comprises a piston in a cylinder, the piston being connected to one of the group consisting of said core and said ejector means, the cylinder being connected to the other one of said group.

5. The apparatus of claim 3 or 4 wherein the volume of the cylinder included by the piston is approximately equal to the volume of the container being molded.

6. The apparatus of claim 2 wherein the fluid is air at a pressure of between 1 and 1.4 atmospheres.

7. The apparatus of claim 6 wherein the means for introducing further comprises a chamber of variable volume connected to the conduit, a means for supplying air at an elevated pressure, and a means for introducing the elevated pressure air to the chamber at a point in the molding cycle other than during part ejection.

8. In combination with an ejection-molding machine having a moving platen, a mold core mounted on the moving platen defining in part the space in which an article is molded, and an ejector means movable with respect to the moving platen for mechanically removing a molded article from the mold core, the improvement comprising
   a source of fluid at about atmospheric pressure,
   a conduit leading from a molding space-defining surface of the mold core to the source of fluid, and
   means in said conduit for introducing a measured volume of said fluid to the molding space-defining surface at a rate controlled by the relative motion between the moving platen and the ejector means.

9. An apparatus for assisting in the removal of an ejection-molded straight wall container from a core of a mold in which the container was formed, the mold core being fixed to a moving platen and having a stripper ring surrounding the core for mechanically removing the container from the core, the apparatus comprising
- a conduit leading to the surface of the mold core defining the bottom of the container, and
- a piston in a cylinder, the interior of the cylinder being connected to the conduit, the cylinder being fixed to said platen, and the piston being fixed to said stripper ring, the volume of the cylinder included by the piston being approximately equal to the container, the cylinder being filled with air at a pressure of approximately 1 atmosphere, the relative movement between the mold core and the stripper ring causing the air within the cylinder to be introduced into the conduit at a rate substantially equal to the rate at which a void develops between the bottom of the container and the mold core as the container is stripped from the mold core.

10. A method of assisting in the removal of an ejection-molded article from a core of a mold in which the article was formed, the mold core being attached to a platen and having an ejector means movable with respect to the platen for mechanically removing the molded article from the core, the method comprising the steps of
- providing a conduit leading to a surface of the mold core against which the molded article is formed, and
- introducing into the conduit a measured volume of fluid at about atmospheric pressure at a rate controlled by the rate of relative motion between the platen and the ejector means.

* * * * *